United States Patent
Lee

(10) Patent No.: US 9,766,731 B2
(45) Date of Patent: Sep. 19, 2017

(54) MANUFACTURING PROCESS AND STRUCTURE OF EDGE-CHAMFERED ONE-GLASS-SOLUTION TOUCH PANEL

(71) Applicant: GHITRON TECHNOLOGY CO., LTD., Hsinchu (TW)

(72) Inventor: Chun-Yuan Lee, Hsinchu (TW)

(73) Assignee: Ghitron Technology Co., Ltd., Hsinchu (TW)

( * ) Notice: Subject to any disclaimer, the term of this patent is extended or adjusted under 35 U.S.C. 154(b) by 98 days.

(21) Appl. No.: 14/818,465

(22) Filed: Aug. 5, 2015

(65) Prior Publication Data
US 2016/0299589 A1    Oct. 13, 2016

(30) Foreign Application Priority Data

Apr. 10, 2015    (TW) .............................. 104111561 A

(51) Int. Cl.
G06F 3/041    (2006.01)
C03C 15/00    (2006.01)

(52) U.S. Cl.
CPC .............. *G06F 3/041* (2013.01); *C03C 15/00* (2013.01); *C03C 2218/34* (2013.01); *G06F 2203/04103* (2013.01)

(58) Field of Classification Search
CPC ...... G06F 3/041; B32B 17/1033; C03C 15/00
See application file for complete search history.

(56) References Cited

U.S. PATENT DOCUMENTS

| | | | |
|---|---|---|---|
| 2012/0052302 A1* | 3/2012 | Matusick ................ | C03C 15/00 428/410 |
| 2013/0295333 A1* | 11/2013 | Kim ........................ | G06F 3/041 428/157 |

* cited by examiner

*Primary Examiner* — Duy Deo
(74) *Attorney, Agent, or Firm* — Rosenberg, Klein & Lee

(57) ABSTRACT

A method for manufacturing an edge-chamfered OGS touch panel is disclosed. Before a pre-prepared glass substrate is subjected to etching, an upper lamination film and a lower lamination film are respectively laminated on upper and lower surfaces of the glass substrate. The upper lamination film is smaller than the lower lamination film so that when the upper lamination film is laminated on the surface of the glass substrate, an edge exposure zone is preserved on the glass substrate at a location adjacent to a substrate edge. When the substrate edge of the glass substrate is subjected to etching, a chamfered edge is formed on the touch operation surface of the glass substrate that is adjacent to the substrate edge.

7 Claims, 8 Drawing Sheets

MANUFACTURING PROCESS AND STRUCTURE OF EDGE-CHAMFERED ONE-GLASS-SOLUTION TOUCH PANEL

BACKGROUND OF THE INVENTION

1. Field of the Invention

The present invention relates to a manufacturing process and a structure of an edge-chamfered one-glass-solution (OGS) touch panel, and in particular to a manufacturing process for forming, after a side edge of an OGS touch panel has been subjected to etching, a chamfered edge on a substrate side edge of a glass substrate.

2. The Related Arts

With the widening application of touch panels, there are more and more electronic products that adopt touch panels as an input measure to provide a simple and intuitive interface operation mode. The known touch panels are generally classified as a resistive type, a capacitive type, and an optic type, according to the operations thereof, among which the capacitive type has excellent vantage in supporting the function of multi-touch and is gaining the favor of the market for being widely used in contemporary electronic products.

Due to the demand of the consumer market for a lighter and thinner outside appearance of the electronic products, the thickness of a final product of a touch panel is reduced by eliminating one transparent substrate and thus space required for the assembly of an electronic product can also be reduced so that the need for making the outside appearance of an electronic product lighter and thinner can be met to satisfy the needs of the market. This has been recently favored and widely used by electronic manufacturers or brand companies.

However, in a conventional manufacture process of one glass solution (OGS) touch panels, there are still problems to be resolved. In such a manufacture process, a large-sized glass panel must be divided by a tool into a plurality of glass substrates. The glass substrates are subjected to etching and after completion of the etching of the glass substrates, films laminated on surfaces of the glass substrates must be peeled off. The glass substrate has a right-angled edge formed along a side edge of the substrate. Such a right-angled edge must be ground to form a chamfered edge and this is done by using a edge grinding machine to process the side edge of the glass substrate. Such processing is generally a physical grinding process so that during the edge grinding, roughness or cracking may result due to the physical grinding process. This may readily cause fracture starting from the roughness or cracking and eventually result in a defect product.

SUMMARY OF THE INVENTION

In view of the above drawbacks of the conventional ways of manufacturing touch panels, a primary object of the present invention is to provide a method for manufacturing an edge-chamfered OGS touch panel, which helps prevent edge roughness or micro cracking from occurring in substrate edges of a glass substrate caused by physical grinding and leading to a defect product.

Another object of the present invention is to provide an edge-chamfered OGS touch panel structure, which comprises a chamfered edge structure formed on a substrate edge of a glass substrate of the OGS touch panel after an etching process.

To achieve the above objects, a method for manufacturing an edge-chamfered OGS touch panel according to a first embodiment of the present invention comprises the following steps:

(a) providing a large-sized glass panel, which has a first surface and a second surface;

(b) forming a plurality of touch units on the second surface of the large-sized glass panel and defining a cutting line between adjacent ones of the touch units, wherein each of the touch units comprises a touch circuit and an edge frame corresponding to the touch circuit;

(c) cutting the large-sized glass panel along the cutting lines to form a plurality of glass substrates, wherein the first surface of each of the glass substrates serves as a touch operation surface and the second surface thereof serves as a circuit formation surface and the glass substrate has two opposite substrate edges;

(d) laminating an upper lamination film and a lower lamination film respectively on the touch operation surface and the circuit formation surface of each of the glass substrates, wherein the upper lamination film has a first width and the lower lamination film has a second width and the first width of the upper lamination film is smaller than the second width of the lower lamination film so that the upper lamination film is laminated on the touch operation surface of the touch unit to form an edge exposure zone on the touch operation surface of the glass substrate at a location adjacent to each of the edges;

(e) subjecting the edges of each of the glass substrates to etching with an etchant agent so that the substrate edges of the glass substrate are etched off and the touch operation surface of the glass substrate is formed with a chamfered edge at a location adjacent to each of the substrate edges; and (f) peeling the upper lamination film and the lower lamination film from the touch operation surface and the circuit formation surface of each of the glass substrates.

Another embodiment of the present invention provides a method for manufacturing an edge-chamfered OGS touch panel, which comprises the following steps:

(a) providing a glass substrate, which has a touch operation surface, a circuit formation surface, and two opposite substrate edges;

(b) forming at least one touch circuit and an edge frame corresponding to the touch circuit on the circuit formation surface of the glass substrate;

(c) laminating an upper lamination film and a lower lamination film respectively on the touch operation surface and the circuit formation surface of the glass substrate, wherein the upper lamination film has a first width and the lower lamination film has a second width and the first width of the upper lamination film is smaller than the second width of the lower lamination film so that the upper lamination film is laminated on the touch operation surface of the glass substrate to form an edge exposure zone on the touch operation surface of the glass substrate at a location adjacent to each of the edges;

(d) subjecting the substrate edges of the glass substrate to etching with an etchant agent so that the substrate edges of the glass substrate are etched off and the touch operation surface of the glass substrate is formed with a chamfered edge at a location adjacent to each of the substrate edges; and (e) peeling the upper lamination film and the lower lamination film from the touch operation surface and the circuit formation surface of the glass substrate.

In an edge-chamfered OGS touch panel structure manufactured with the method according to the present invention, a chamfered edge is formed on the touch operation surface of the glass substrate at a location adjacent to a substrate edge and the chamfered edge corresponds to an edge frame of the circuit formation surface of the glass substrate.

The feature of the present invention is that a chamfered edge structure is formed on a substrate edge of a glass substrate of a OGS touch panel after etching so that there is no need to subject the glass substrate to physical grinding for forming the chamfered edge. As such, product defects caused by edge roughness or micro cracking occurring in the substrate edge of glass substrate resulting from physical grinding can be avoided. Further, the manufacturing technique provided in the present invention allows for simplification of the manufacture of OGS touch panels and thus may save operations and time and labor costs.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
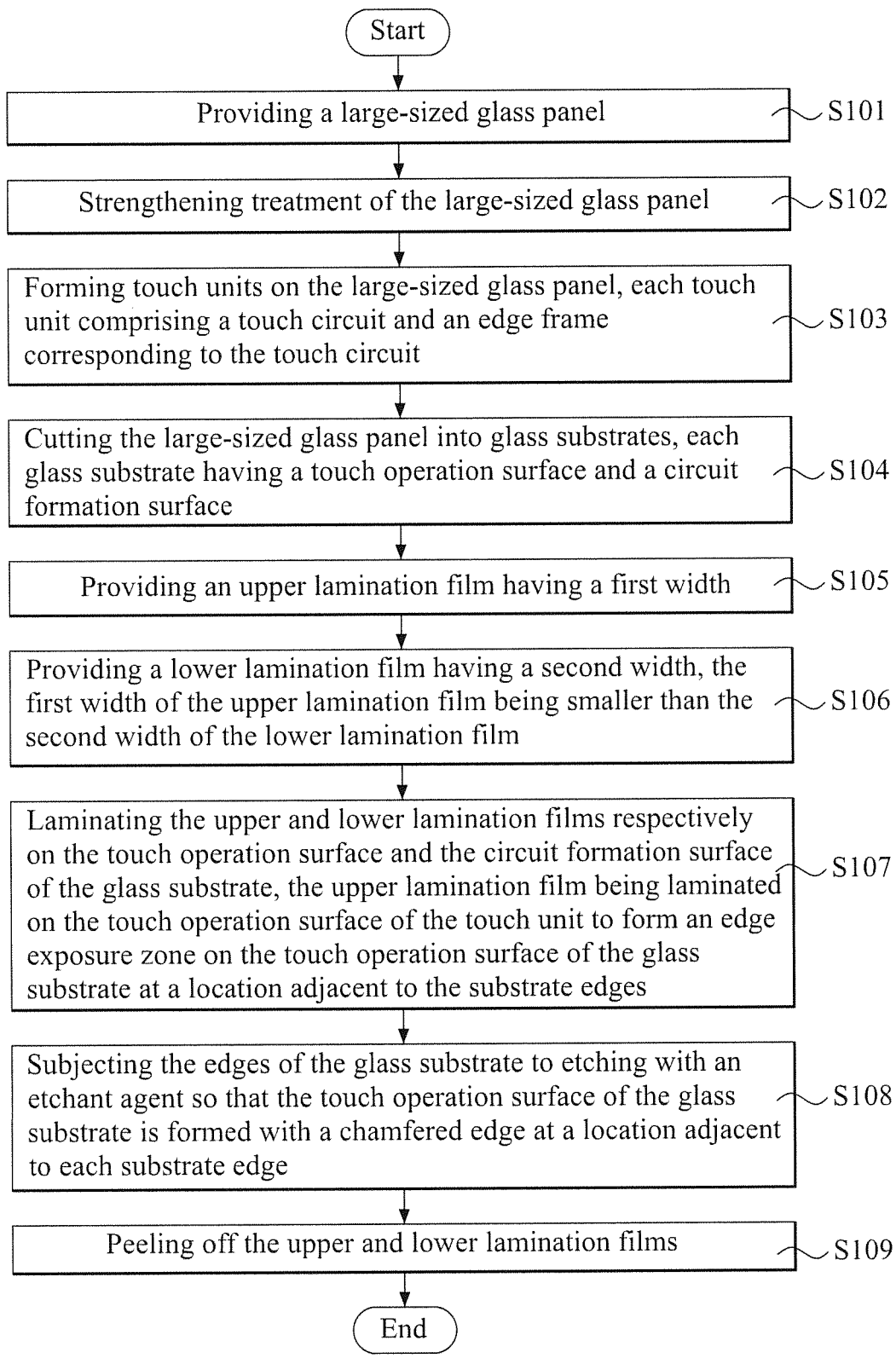
FIG. 1 is a flow chart illustrating a manufacturing process according to a first embodiment of the present invention.
Figure 2:
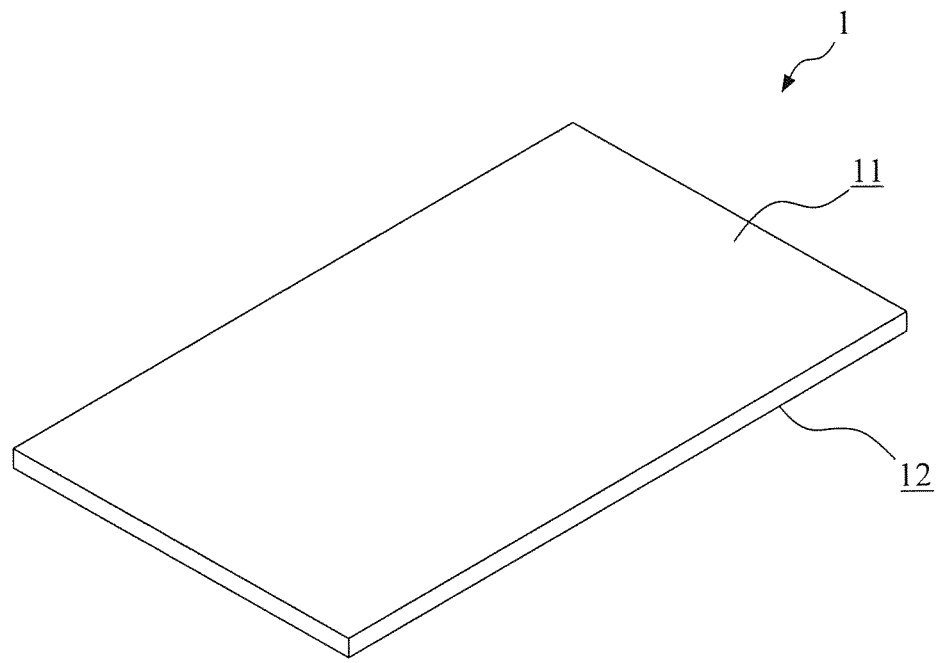
FIG. 2 is a perspective view showing a large-sized glass panel according to the first embodiment of the present invention.

With reference to the drawings and in particular to FIGS. 1 and 2, in a manufacturing process according to a first embodiment of the present invention, a large-sized glass panel 1 is first prepared, Step S101. The large-sized glass panel 1 comprises a first surface 11 and a second surface 12 (as shown in FIG. 2), wherein the first surface 11 provides an operation surface for providing a touch function, while the second surface 12 provides a surface for forming touch circuits thereon. The large-sized glass panel 1 can be selectively made of one of transparent glass and transparent plastics and is not limited solely to glass material.

In Step S102, the present invention is cast by subjecting the large-sized glass panel 1 to a strengthening treatment. During the strengthening treatment, one of commonly known chemical strengthening and physical strengthening can be adopted as a process for strengthening, by which surface hardness of the large-sized glass panel 1 is enhanced. Taking chemical strengthening as an example, generally, the large-sized glass panel 1 is subjected to ion exchange at a high temperature of 450-500 degrees Celsius in order to increase the glass strength.

Figure 3:
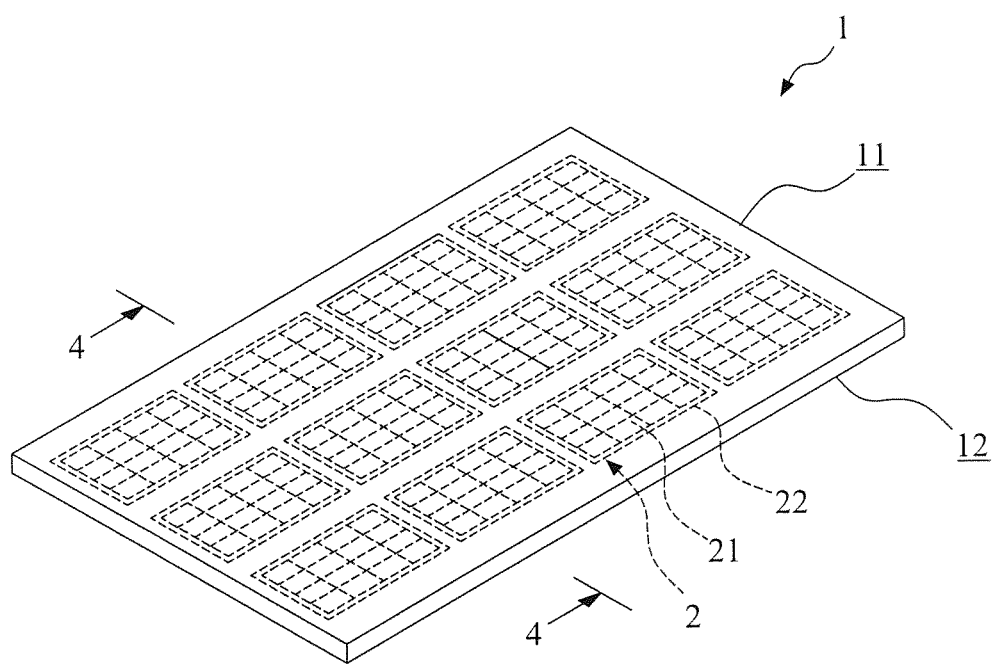
FIG. 3 is a schematic perspective view illustrating forming a plurality of touch circuits and edge frames on a second surface of the large-sized glass panel according to the first embodiment of the present invention.
Figure 4:
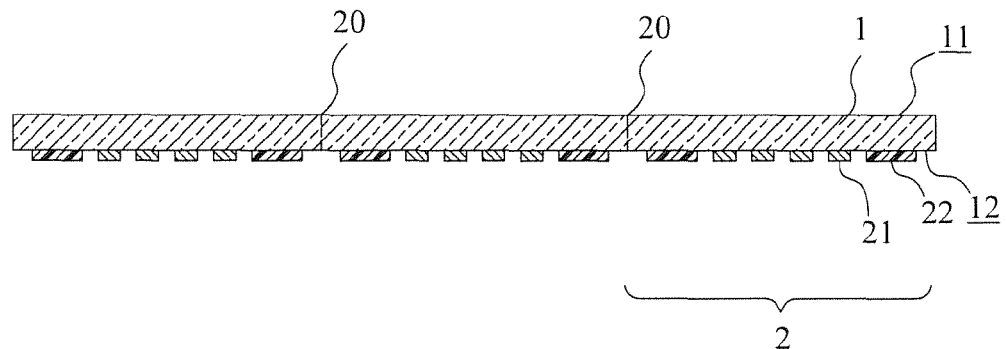
FIG. 4 is a cross-sectional view taken along line 4-4 of FIG. 3.

Referring to FIGS. 3 and 4, in Step S103, the present invention is performed by forming a plurality of touch units 2 the second surface 12 of the large-sized glass panel 1 and define at least one cutting line 20 between every adjacent ones of the touch units 2. Each of the touch units 2 comprises at least one touch circuit 21 and an edge frame 22 corresponding to the touch circuit 21. The edge frame 22 is generally formed along a perimeter of the touch circuit 21. The edge frame 22 can be a black, white, or other color edge frame.

Figure 5:
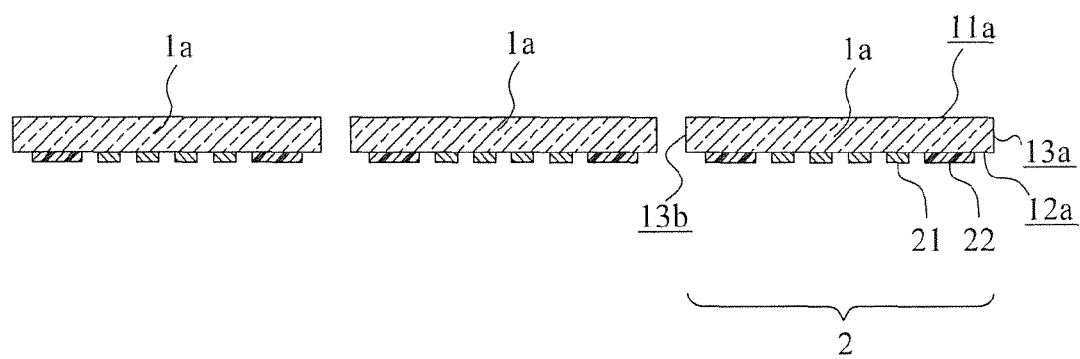
FIG. 5 is a schematic view illustrating cutting the large-sized glass panel into a plurality of glass substrates along cutting zones.

Referring to FIG. 5, in Step S104, the large-sized glass panel 1 is subjected to cutting along the cutting line 20 to split the large-sized glass panel 1 into a plurality of glass substrates 1a. Each of the glass substrates 1a so cut has a first surface, which serves as a touch operation surface 11a, and a second surface, which serves as a circuit formation surface 12a. And, the glass substrate 1a has two opposite side edges that are referred to and form, respectively two opposite "substrate edges" 13a, 13b.

Figure 6:
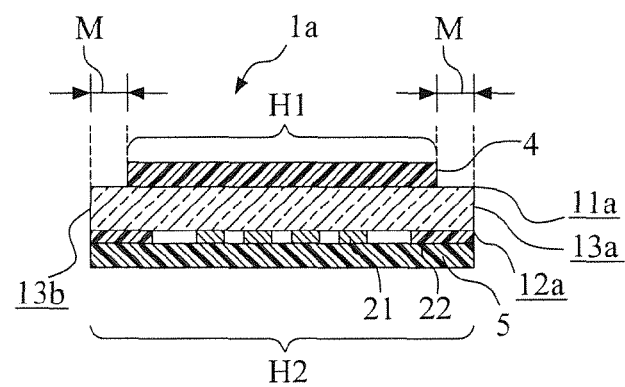
FIG. 6 is a schematic view illustrating laminating an upper lamination film and a lower lamination film respectively on a touch operation surface and a circuit formation surface of a glass substrate.

Referring to FIG. 6 and Steps S105, S106, and S107, an upper lamination film 4 and a lower lamination film 5 are prepared. The upper lamination film 4 has a first width H1 and the lower lamination film 5 has a second width H2. The first width H1 of the upper lamination film 4 is smaller than the second width H2 of the lower lamination film 5. The upper lamination film 4 and the lower lamination film 5 are made of materials that comprise acidic corrosion resistant materials so as to protect the glass surfaces from scratching and to provide an effect of protection of the glass against etching and corrosion in the subsequent operations.

Then, the upper lamination film 4 and the lower lamination film 5 are respectively laminated on the touch operation surface 11a and the circuit formation surface 12a of the glass substrate 1a. In laminating the upper lamination film 4 on the touch operation surface 11a of the glass substrate 1a, an edge exposure zone M is preserved on the touch operation surface 11a of the glass substrate 1a at a location adjacent to each of the substrate edges 13a, 13b.

Figure 7:
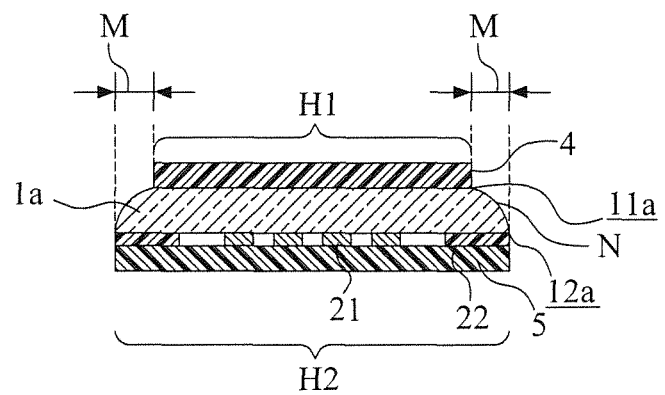
FIG. 7 is a schematic view illustrating subjecting a substrate edge of the glass substrate to etching according to the first embodiment of the present invention.
Figure 8:
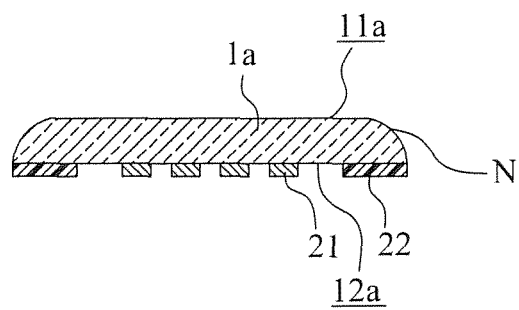
FIG. 8 is a schematic view illustrating peeling off the upper lamination film and the lower lamination film according to the first embodiment of the present invention.

Referring to FIGS. 7 and 8, in Step S108 and S109, the substrate edges 13a, 13b of the glass substrate 1a are subjected to etching with an etchant agent so that the substrate edges 13a, 13b of the glass substrate 1a are etched and a chamfered edge N is formed on the glass substrate 1a at a location adjacent to each of the substrate edges 13a, 13b. The etchant agent can be a hydrogen fluoride (HF) included solution, with which the etching operation is conducted. After the etching is completed, the upper lamination film 4 and the lower lamination film 5 are peeled from the touch operation surface 11a and the circuit formation surface 12a of the glass substrate 1a.

In the OSG touch panel structure manufactured with the process of the present invention, the substrate edges 13a, 13b of the glass substrate 1a are each formed with a chamfered edge N on the touch operation surface 11a in such away that the chamfered edge N corresponds to the edge frame 3 formed on the circuit formation surface 12a.

Figure 9:
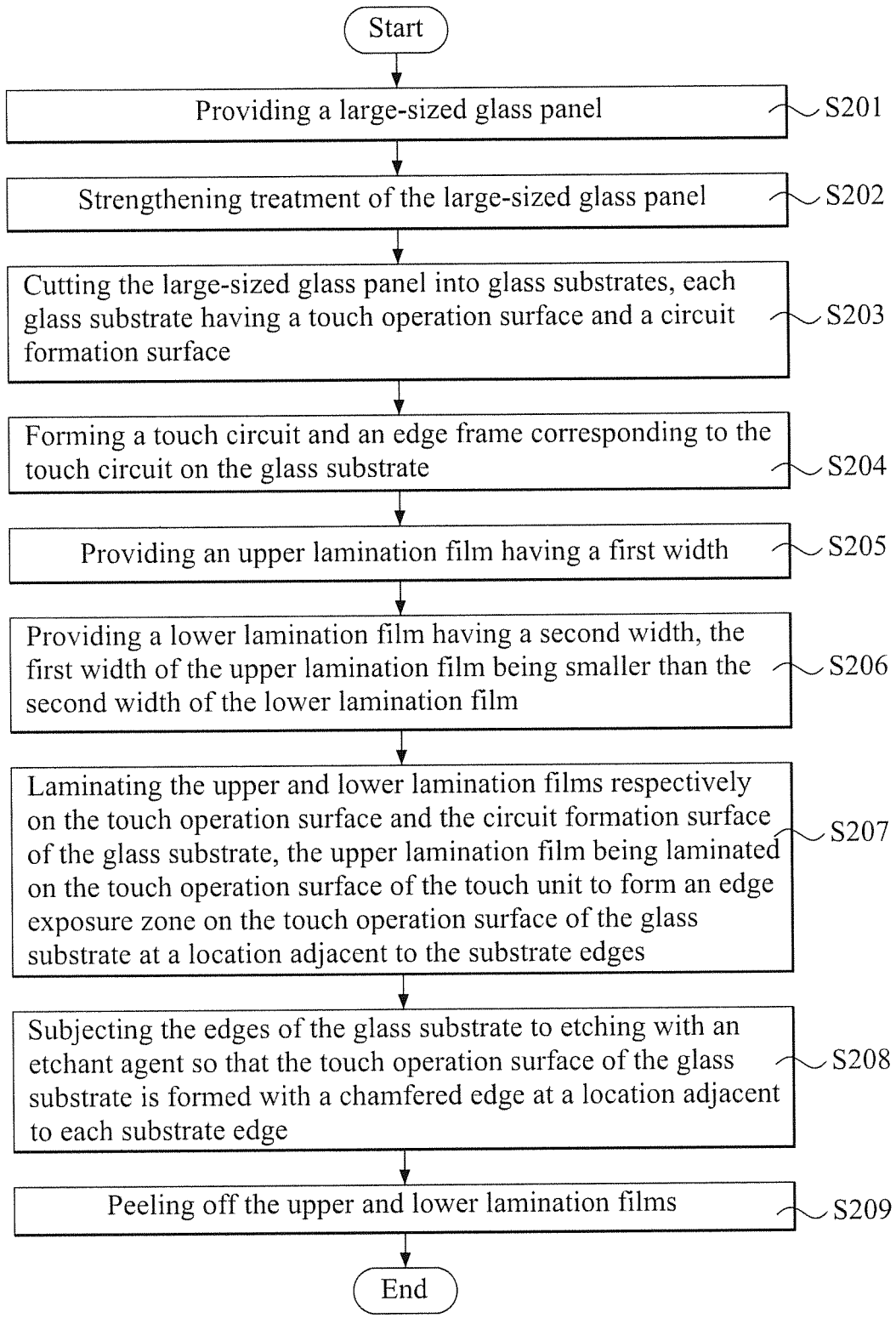
FIG. 9 is a flow chart illustrating a manufacturing process according to a second embodiment of the present invention.
Figure 10:
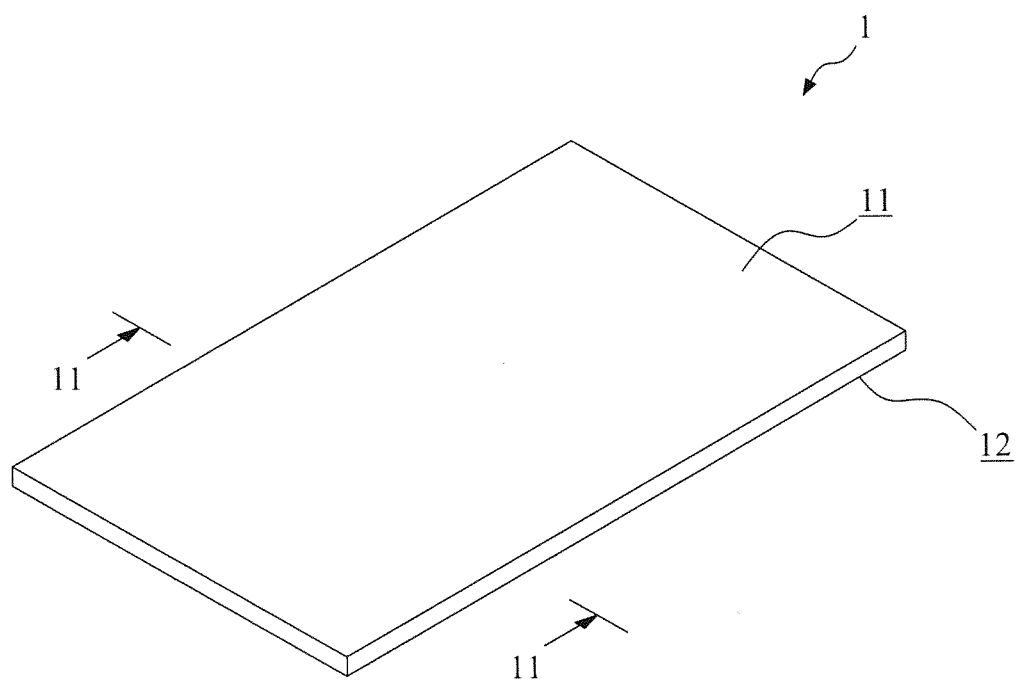
FIG. 10 is a perspective view showing a large-sized glass panel according to the second embodiment of the present invention.
Figure 11:
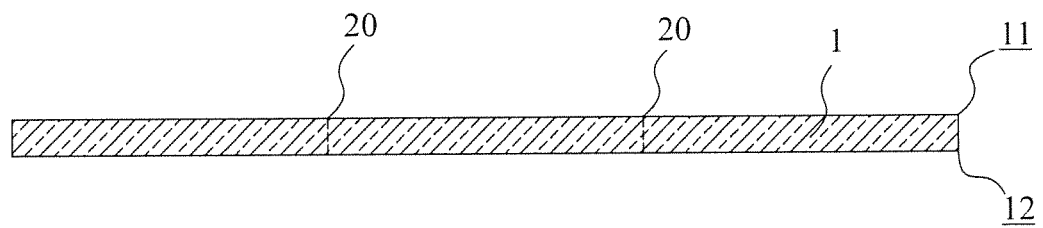
FIG. 11 is a cross-sectional view taken along line 11-11 of FIG. 10.

Referring to FIG. 9, a manufacturing process according to a second embodiment of the present invention is illustrated. Most of the components and operations/steps of the instant embodiment are similar to those of the first embodiment so that corresponding components/operations/steps are designated with the same reference numerals for consistency. In the instant manufacturing process of the present invention, a large-sized glass panel 1 is first prepared, as illustrated in Step S201 and FIGS. 10 and 11.

In Step S202, the present invention is cast by subjecting the large-sized glass panel 1 to a strengthening treatment. During the strengthening treatment, one of commonly known chemical strengthening and physical strengthening can be adopted as a process for strengthening, by which surface hardness of the large-sized glass panel 1 is enhanced. A plurality of cutting lines 20 is defined in the large-sized glass panel 1.

Figure 12:
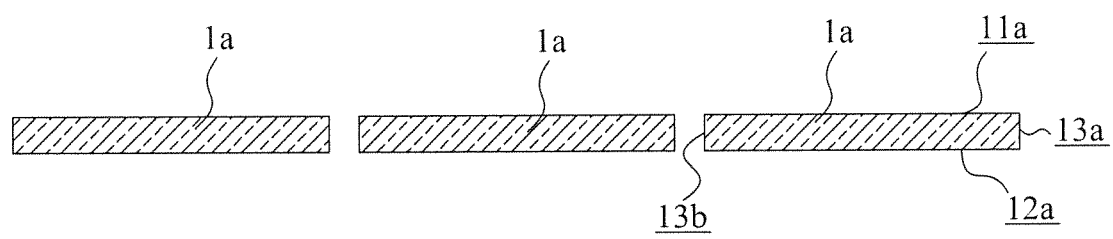
FIG. 12 is a schematic view illustrating cutting the large-sized glass panel into a plurality of glass substrates according to the second embodiment of the present invention.
Figure 13:
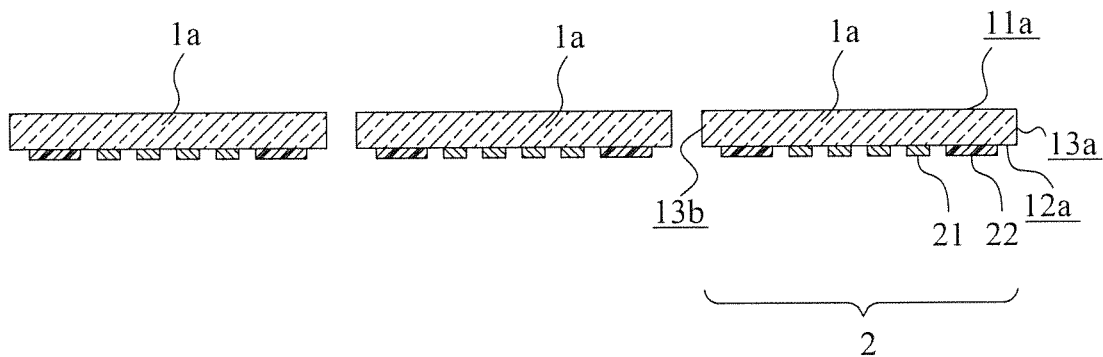
FIG. 13 is a schematic perspective view illustrating forming a plurality of touch circuits and edge frames on circuit formation surfaces of the glass substrates according to the second embodiment of the present invention.
Figure 14:
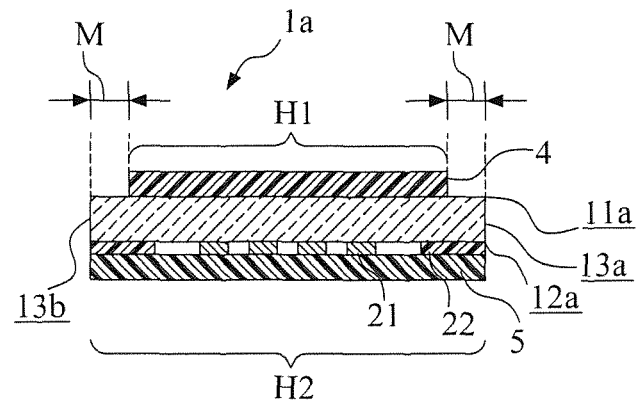
FIG. 14 is a schematic view illustrating laminating an upper lamination film and a lower lamination film respectively on a touch operation surface and a circuit formation surface of a glass substrate according to the second embodiment of the present invention.

Referring to FIGS. 12 and 13 and Steps S203 and S204, the large-sized glass panel 1 is subjected to cutting along the cutting lines 20 to split the large-sized glass panel 1 into a plurality of glass substrates 1a and each of the glass substrates 1a has a touch operation surface 11a and a circuit formation surface 12a. The circuit formation surface 12a is provided with a touch circuit 21 and an edge frame 22. Referring to FIG. 14 and Steps S205, S206, and S207, an upper lamination film 4 and a lower lamination film 5 are respectively laminated on the touch operation surface 11a and the circuit formation surface 12a of the glass substrate 1a. The upper lamination film 4 has a first width H1 and the lower lamination film 5 has a second width H2. The first width H1 of the upper lamination film 4 is smaller than the second width H2 of the lower lamination film 5. In laminating the upper lamination film 4 on the touch operation surface 11a of the glass substrate 1a, an edge exposure zone M is preserved on the touch operation surface 11a of the glass substrate 1a at a location adjacent to each of the substrate edges 13a, 13b.

Figure 15:
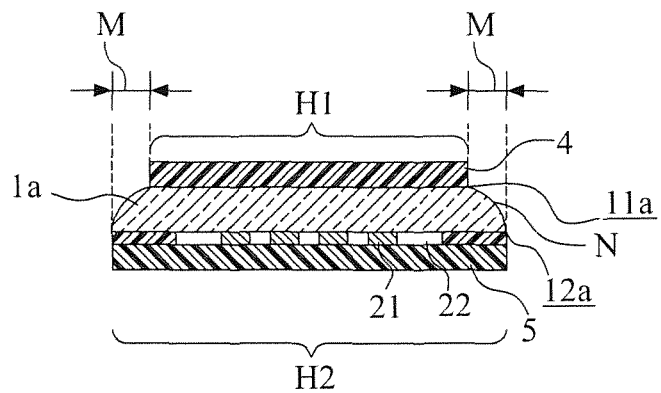
FIG. 15 is a schematic view illustrating subjecting an edge of the glass substrate to etching according to the second embodiment of the present invention.
Figure 16:
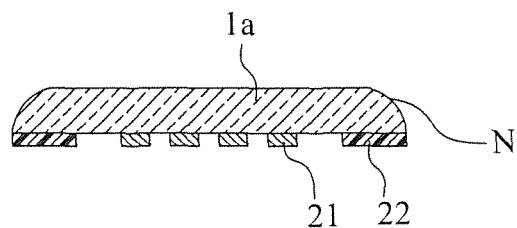
FIG. 16 is a schematic view illustrating peeling off the upper lamination film and the lower lamination film according to the second embodiment of the present invention.

Referring to FIGS. 15 and 16, in Steps S208 and S209, the substrate edges 13a, 13b of the glass substrate 1a are subjected to etching with an etchant agent so that the substrate edges 13a, 13b of the glass substrate 1a are etched and a chamfered edge N is formed on the glass substrate 1a at a location adjacent to each of the substrate edges 13a, 13b. After the etching is completed, the upper lamination film 4 and the lower lamination film 5 are peeled from the touch operation surface 11a and the circuit formation surface 12a of the glass substrate 1a.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for manufacturing an edge-chamfered one-glass-solution touch panel, the method comprising:
   (a) providing a large-sized glass panel, which has a first surface and a second surface;
   (b) forming a plurality of touch units on the second surface of the large-sized glass panel and defining a cutting line between adjacent ones of the touch units, wherein each of the touch units includes a touch circuit and an edge frame corresponding to the touch circuit;
   (c) cutting the large-sized glass panel along the cutting lines to form a plurality of glass substrates, wherein the first surface of each of the glass substrates serves as a touch operation surface and the second surface thereof serves as a circuit formation surface and the glass substrate has two opposite substrate edges;
   (d) laminating an upper lamination film and a lower lamination film respectively on the touch operation surface and the circuit formation surface of each of the glass substrates, the upper lamination film having a first width, the upper lamination film partially covering the touch operation surface while leaving edge exposure zones uncovered on the touch operation surface at locations adjacent to each of the edges, the lower lamination film having a second width larger than the first width of the upper lamination film, the lower lamination film covering both the touch circuit and the edge frame of the circuit formation surface;
   (e) subjecting the edges of each of the glass substrates to etching with an etchant agent such that the substrate edges of the glass substrate are etched in the edge exposure zone to thereby form a chamfered edge on the touch operation surface of the glass substrate at a location adjacent to each of the substrate edges, the edge frame of the circuit formation surface remaining flat; and
   (f) peeling the upper lamination film and the lower lamination film from the touch operation surface and the circuit formation surface of each of the glass substrates.

2. The method as claimed in claim 1, wherein the etchant agent includes a hydrogen fluoride (HF) included solution.

3. The method as claimed in claim 1, wherein a composition of the large-sized glass panel includes at least one of transparent glass and transparent plastic.

4. The method as claimed in claim 1, further comprising subjecting the large-sized glass panel to a strengthening treatment after operation (a).

5. A method for manufacturing an edge-chamfered one-glass-solution touch panel, the method comprising:
   (a) providing a glass substrate, which has a touch operation surface, a circuit formation surface, and two opposite substrate edges;
   (b) forming at least one touch circuit and an edge frame corresponding to the touch circuit on the circuit formation surface of the glass substrate;
   (c) laminating an upper lamination film and a lower lamination film respectively on the touch operation surface and the circuit formation surface of the glass substrate, the upper lamination film having a first width, the upper lamination film partially covering the touch operation surface while leaving edge exposure zones uncovered on the touch operation surface at locations adjacent to each of the edges, the lower lamination film having a second width larger than the first width of the upper lamination film, the lower lamination film covering both the touch circuit and the edge frame of the circuit formation surface;

(d) subjecting the substrate edges of the glass substrate to etching with an etchant agent such that the substrate edges of the glass substrate are etched in the edge exposure zone to thereby form a chamfered edge on the touch operation surface of the glass substrate at a location adjacent to each of the substrate edges, the edge frame of the circuit formation surface remaining flat; and (e) peeling the upper lamination film and the lower lamination film from the touch operation surface and the circuit formation surface of the glass substrate.

6. The method as claimed in claim 5, wherein the etchant agent includes a hydrogen fluoride (HF) included solution.

7. The method as claimed in claim 5, wherein a composition of the glass substrate includes at least one of transparent glass and transparent plastic.

* * * * *